(12) United States Patent
Lee

(10) Patent No.: US 7,077,441 B2
(45) Date of Patent: Jul. 18, 2006

(54) BUMPER REINFORCEMENT FOR AN AUTOMOBILE

(76) Inventor: Hwa Sun Lee, 118-305 Clover Apt., 1509 Dunsan-1-dong, Seo-gu, Daejeon (KR) 302-772

( * ) Notice: Subject to any disclaimer, the term of this patent is extended or adjusted under 35 U.S.C. 154(b) by 0 days.

(21) Appl. No.: 11/198,523

(22) Filed: Aug. 5, 2005

(65) Prior Publication Data
US 2006/0028034 A1  Feb. 9, 2006

(30) Foreign Application Priority Data
Aug. 9, 2004  (KR) ............... 2004-0062466
Aug. 1, 2005  (KR) ............... 10-2005-0070421

(51) Int. Cl.
*B60R 19/34* (2006.01)

(52) U.S. Cl. .............. 293/133; 293/120; 293/154

(58) Field of Classification Search ............ 293/120, 293/121, 133, 132, 135, 154
See application file for complete search history.

(56) References Cited

U.S. PATENT DOCUMENTS

| | | | | |
|---|---|---|---|---|
| 4,941,701 | A * | 7/1990 | Loren | 293/120 |
| 6,540,276 | B1 * | 4/2003 | Azuchi et al. | 293/120 |
| 6,669,252 | B1 * | 12/2003 | Roussel et al. | 293/120 |
| 2004/0094975 | A1 * | 5/2004 | Shuler et al. | 293/120 |
| 2005/0104392 | A1 * | 5/2005 | Liebhard et al. | 293/132 |

* cited by examiner

*Primary Examiner*—Jason Morrow
(74) *Attorney, Agent, or Firm*—Madson & Austin

(57) ABSTRACT

The present invention provides a bumper reinforcement comprising a body having a upper plate, a front plate connected with a front end of the upper plate and extended downward, and a lower plate connected with a lower end of the front plate; towers, each of which including a base plate provided in a rear part thereof to be mounted on a body frame of a vehicle and a lateral plate formed at one end of the base plate to be connected to the body; and a connecting part to connect the body and the towers, wherein the front plate of the body has a upper part, a lower part and a middle part, and the connecting part comprises parallel parts to connect the upper and lower parts of the front plate of the body with a front end of the lateral plate of the tower, and a slant part to connect the middle part of the front plate of the body with a rear end of the lateral plate of the tower.

5 Claims, 6 Drawing Sheets

Deformation
<Prior art>

Deformation
<Present invention>

BUMPER REINFORCEMENT FOR AN AUTOMOBILE

FIELD OF THE INVENTION

The present invention relates to a bumper reinforcement for an automobile, and more particularly to a bumper reinforcement for an automobile including parallel parts and a slant part between a body and towers thereof, thus enabling to absorb force for deformation due to impact from the outside and prevent breakage thereof.

BACKGROUND OF THE INVENTION

A bumper of a motor vehicle is provided on the front or back of an automobile to lessen the shock or damage when it hits anything. Inside of the bumper, a bumper reinforcement is provided to strengthen and support the activity of the bumper. Conventional bumper reinforcements to absorb the impact upon collision on automobiles are illustrated in FIGS. 1 to 5.

FIG. 1 is an exploded perspective view of a bumper (1) for an automobile and a reinforcement (10) therefor, wherein the bumper reinforcement (10) is provided behind the bumper (1) to give an additional support to the bumper (1) upon collision.

FIG. 2 is a partial sectional view of the conventional bumper reinforcement, and FIG. 3 is a rear perspective view showing a part of the conventional bumper reinforcement.

The conventional bumper reinforcement (10) comprises a body (12) with a vertical section in the shape of "⊏" and towers (14) provided at both side ends of the body (12) and having vertical lateral surfaces (16).

Each of the towers (14) is mounted on a body frame of a vehicle (not shown) at its base plate and serves to buffer the pressure and tension from the bumper (1) generated upon collision and prevent the impact and the pressure and tension from being directly transmitted to the body frame.

In case of collision, the deformation and breakage due to the impacts of the collision most frequently occurs in a part where the lateral surfaces of the towers (14) and the body (12) are connected as shown in FIG. 3.

Therefore, in case of a head-on collision or a broadside collision of an automobile, the bumper reinforcement (10) with the towers (14) as above becomes twisted and deformed due to the force transmitted to the part 'A' of FIG. 3. In this case, since the deformation is permanent, even for a weak collision, the entire bumper should be replaced with a new one.

In order to solve these problems, an improved bumper reinforcement has been suggested in Korean Patent No. 340464.

As shown in FIGS. 4 and 5, a slant part is provided at a connecting part between a body and towers of the bumper reinforcement, so that the deformation upon collision can be minimized and the permanent deformation can be decreased, thereby extending the life span of the bumper.

That is, since such bumper reinforcement was formed slant at the connecting part, and since a slant surface (20) of the connecting part supported a upper plate (18) and a lower plate (19) in the middle as shown in FIG. 5, the connecting part became strengthened and more resistant against the impacts.

However, the connecting part could not absorb the force for deformation sufficiently. Therefore, if an impact over the limit was given to the bumper, a part of the body (D) of the bumper reinforcement became damaged and consequently the collision energy to be absorbed by the bumper reinforcement decreased.

Further, since the respective ends of the upper and lower plates (18 and 19) of the conventional bumper reinforcement was in linear contact with the bumper, rather than a surface contact, if the collision occurred, one ends of the respective upper plate (18) and lower plate (19) were pressed and bent upon the bumper, and thus they became damaged.

SUMMARY OF THE INVENTION

Accordingly, an object of the present invention is to solve the above disadvantages of the conventional bumper reinforcements by providing a novel bumper reinforcement which has a modified structure in a connecting part between a body and towers thereof, to allow a surface contact with a bumper, rather than a linear contact, and to increase the tolerable strength.

Another object of the present invention is to provide a bumper reinforcement, which deforms in response to the impacts even over the tolerable limit, but can moderately absorb the impacts, so that the breakage of the reinforcement can be prevented and the endurable impulsive strength can be increased.

In order to achieve the above objects, the present invention provides a bumper reinforcement comprising:

a body having an upper plate, a front plate connected to a front end of the upper plate and extending downward, and a lower plate connected to a lower end of the front plate;

towers, each of which includes a base plate provided in a rear part thereof to be mounted on a body frame of a vehicle and a lateral plate extending from one end of the base plate to a front part of each tower; and a connecting part to connect the body and the towers, wherein the front plate of the body has an upper part, a lower part and a middle part, and the connecting part comprises parallel parts to connect the upper and lower parts of the front plate of the body with a front end of the lateral plate of the tower, and a slant part to connect the middle part of the front plate of the body with a rear end of the lateral plate of the tower.

More specifically, the parallel parts comprise a upper connecting part to connect the upper part of the front plate with the front upper end of the lateral plate, and a lower connecting part to connect the lower part of the front plate with the front lower end of the lateral plate. Between the upper connecting part and the lower connecting part, the slant part is provided to connect the middle part of the front plate with the rear end of the lateral plate of the tower.

Further, the front plate of the body may be grooved backward in its middle part to form a groove, in addition to the upper part and the lower part.

BRIEF DESCRIPTION OF THE DRAWINGS

The accompanying drawings, which are included to provide a further understanding of the invention and are incorporated in and constitute a part of this specification, illustrate an embodiment of the invention and together with the description serve to explain the principles of the invention, wherein:

FIG. 7a is a sectional view taken along the line B-B' of FIG. 6a;

DETAILED DESCRIPTION OF THE PREFERRED EMBODIMENTS

Reference will now be made in detail to preferred embodiments of the present invention in conjunction with the accompanying drawings.

Figure 7A:
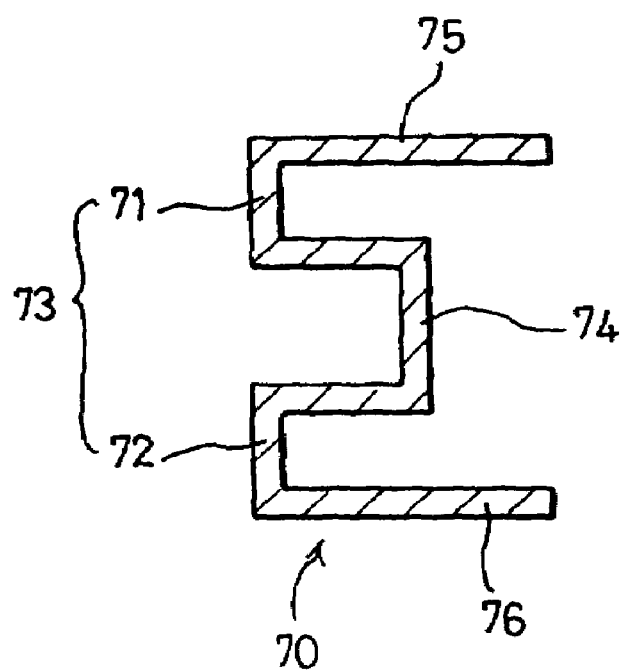
Figure 7B:
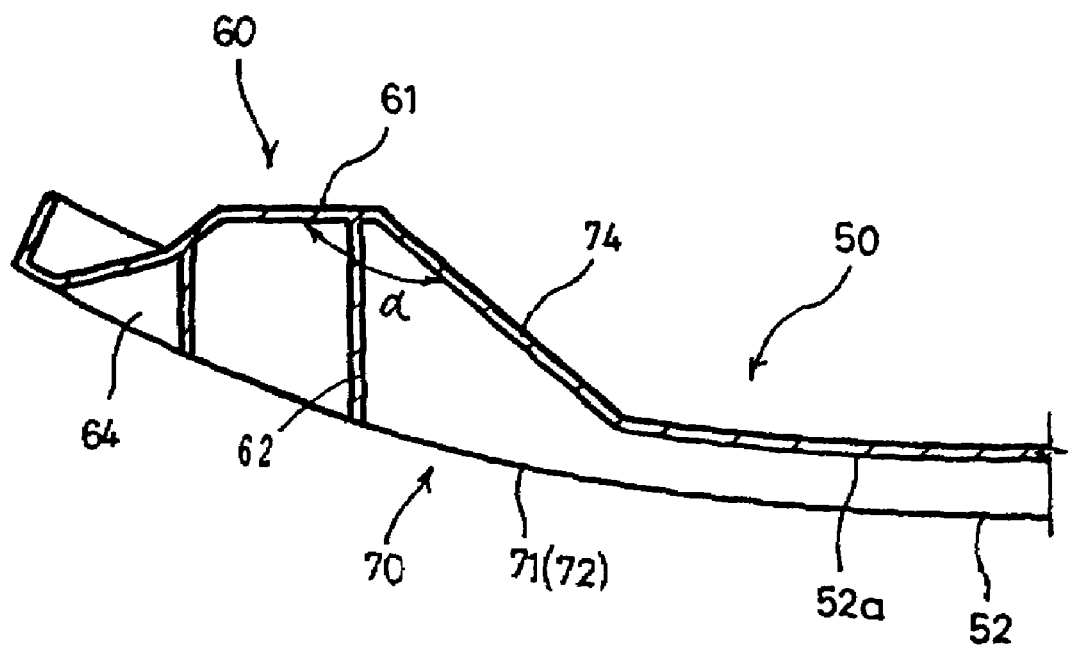
FIG. 7b is a sectional view taken along the line C-C' of FIG. 6b.
Figure 8:
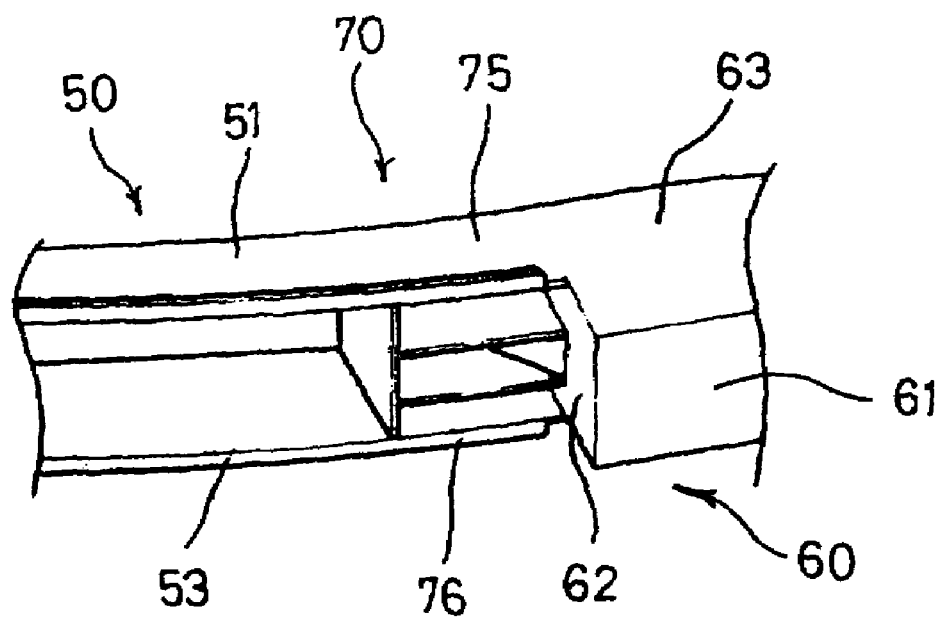
FIG. 8 is a rear perspective view showing a part of the bumper reinforcement according to an embodiment of the present invention.
Figure 9:
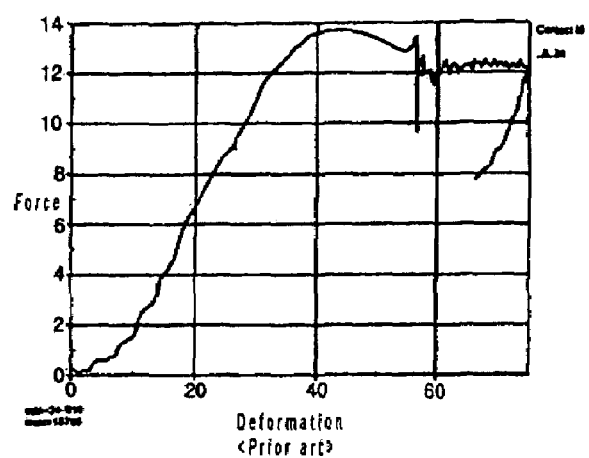
FIG. 9 shows impact test results for the conventional bumper reinforcement and the bumper reinforcement according to an embodiment of the present invention.
Figure 9:
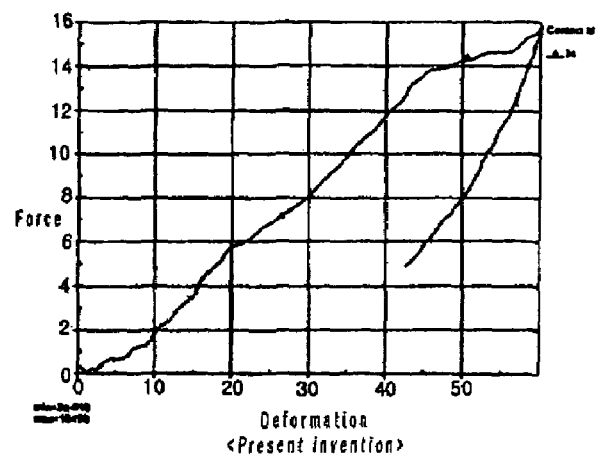

As shown in FIGS. 6 to 8, a bumper reinforcement according to the present invention comprises:

a body (50) having an upper plate (51), a front plate (52) connected to a front end of the upper plate (51) and extending downward, and a lower plate (53) connected to a lower end of the front plate (52);

towers (60), each of which includes a base plate (61) provided in a rear part thereof to be mounted on a body frame of a vehicle and a lateral plate (62) extending from one end of the base plate (61) to a front part of each tower; and a connecting part (70) to connect the body (50) and the towers (60), wherein the front plate (52) of the body (50) has an upper part, a lower part and a middle part, and the connecting part (70) comprises parallel parts (73) to connect the upper and lower parts of the front plate (52) of the body (50) with a front end of the lateral plate (62) of the tower (60), and a slant part (74) to connect the middle part of the front plate (52) of the body (50) with a rear end of the lateral plate (62) of the tower (60).

Figure 6A:
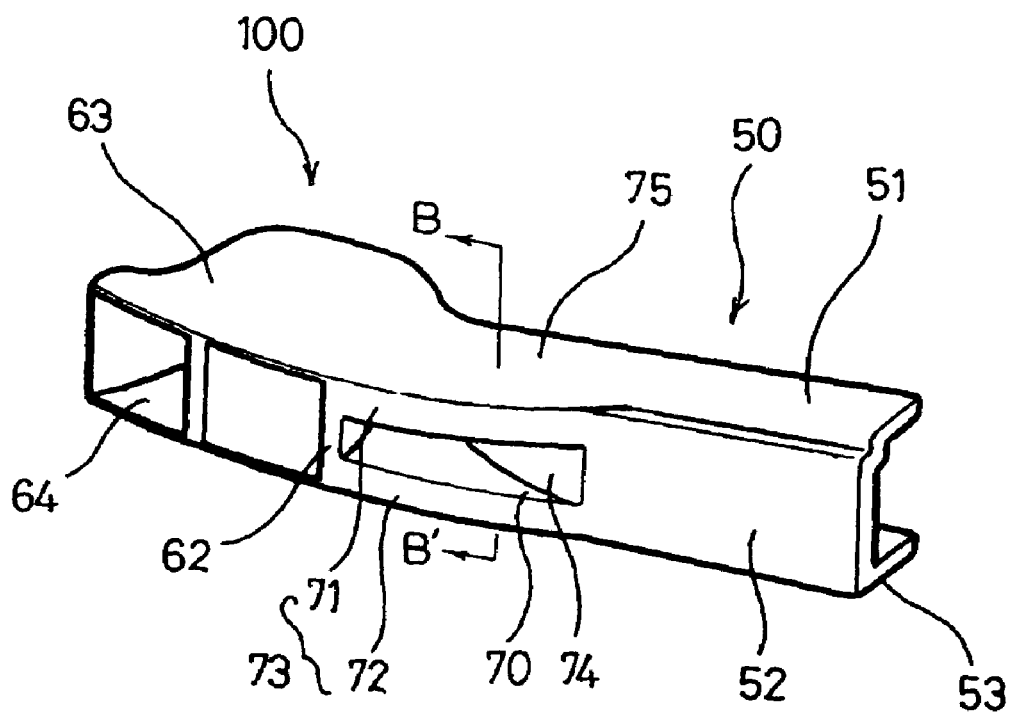
FIGS. 6a and 6b are partial perspective views showing a cross-section of a bumper reinforcement according to embodiments of the present invention.

Specifically, referring to FIG. 6a, the body (50) of the bumper reinforcement (100) according to the present invention is formed in the shape of "⊏" with its rear side open.

On both sides of the body (50), the towers (60) are provided symmetrically. In the drawings, only one tower is shown, but the other tower is symmetrically provided on its opposing side end.

The tower (60) comprises the base plate (61; shown in FIG. 7b) and the lateral plate (62). The base plate (61) is provided in the rear of the tower (60) and is connected to the body frame of a vehicle. Further, the lateral plate (62) is provided proximate to the body (50) at a lateral side end of the tower (60).

In addition, a upper tower plate (63) and a lower tower plate (64) are provided above and below the lateral plate (62) of the tower (60), respectively.

The body (50) and the towers (60) are connected by the connecting part (70). The connecting part (70) comprises the parallel parts (73) having a upper connecting part (71) and a lower connecting part (72), and the slant part (74).

The upper connecting part (71) is formed in the shape of a plate and serves to connect the upper part of the front plate (52) with the front upper end of the lateral plate (62).

Further, the lower connecting part (72) is formed in the shape of a plate and serves to connect the lower part of the front plate (52) with the front lower end of the lateral plate (62).

The slant part (74) connects the middle part of the front plate (52) of the body (50) with the rear end of the lateral plate (62) of the tower (60) to form a connecting slope.

FIG. 7a shows a cross section of the bumper reinforcement, which is taken along the line B–B' of FIG. 6a.

Figure 6B:
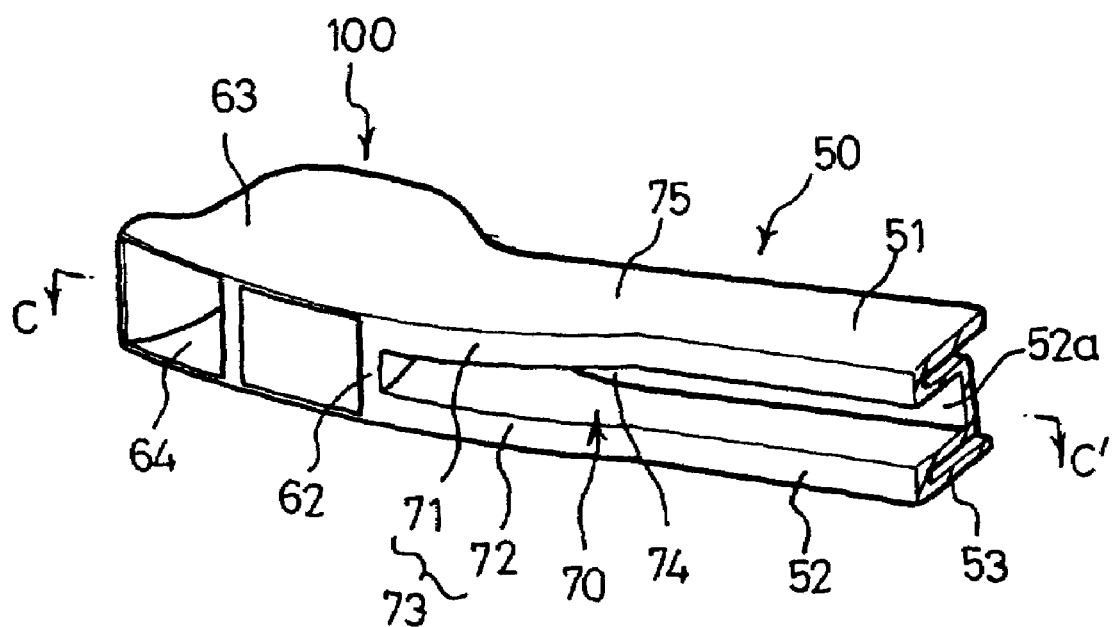

FIG. 6b and FIG. 7b show another embodiment of the present invention.

In FIG. 6b, the front plate (52) of the body (50) is grooved in its middle part to form a bead groove (52a), in addition to the upper part and the lower part.

It is preferable that the bead groove (52a) is formed to have substantially the same height as that of the slant part (74), which has been formed between the upper connecting part (71) and the lower connecting part (72).

Therefore, as shown in FIG. 6b, the bead groove (52a) is integrally connected with the slant part (74) in the same surface, and the upper part and the lower part of the front plate (52) are integrally connected with the upper connecting part (71) and the lower connecting part (72) respectively in the same surface.

The formation of the bead groove (52a) in the front plate (52) increases the section modulus, which remarkably increases the absorbability of large impact caused by a head-on collision or a rear-end collision.

The angle ($\alpha$) formed between the base plate (61) of the tower (60) and the slant part (74) can be varied depending on strength required for the bumper reinforcement. That is, when the bumper reinforcement requires a higher strength, the angle ($\alpha$) should be increased and when a lower strength is required, the angle ($\alpha$) should be decreased.

On top of the upper connecting part (71), a upper connecting plate (75) is integrally formed therewith to be integrally connected with the upper plate (51) of the body (50) and the upper tower plate (63).

Likewise, below the lower connecting part (72), a lower connecting plate (76) is integrally formed therewith as a bottom surface to be integrally connected with the lower plate (52) of the body (50) and the lower tower plate (64).

The bumper reinforcement (100) of the present invention functions as follows:

If a front bumper collides, the impact is transmitted to the connecting part (70) between the body (50) and the towers (60) of the bumper reinforcement (100) and then to the upper connecting plate (75) and the lower connecting plate (76) of the connecting part (70), so that the upper and lower connecting plates (75 and 76) are deformed.

In the present invention, however, since the parallel parts (73) and the slant part (74) are provided between the body (50) and the towers (60), the force for deformation of the upper and lower connecting plates (75 and 76) can be easily absorbed.

Also, since the parallel parts (73) are formed in the shape of a plate to make a surface contact with the bumper, rather than a linear contact, even if the collision occurs, ends of the upper and lower connecting plates (75 and 76) cannot be deformed and damaged.

Therefore, even for a severe impact given to the bumper, the breakage of the bumper reinforcement can be prevented.

The area ratio of the parallel parts (73) and the slant part (74) can be varied depending on strength and degree of deformation required for the bumper reinforcement.

That is, if a lower strength and relatively severe deformation is required, the area of the parallel parts (73) can be increased to prevent the breakage of the bumper reinforcement. Also, if a higher strength and a little deformation are required, the area of the slant part (74) can be increased.

Figure 1:
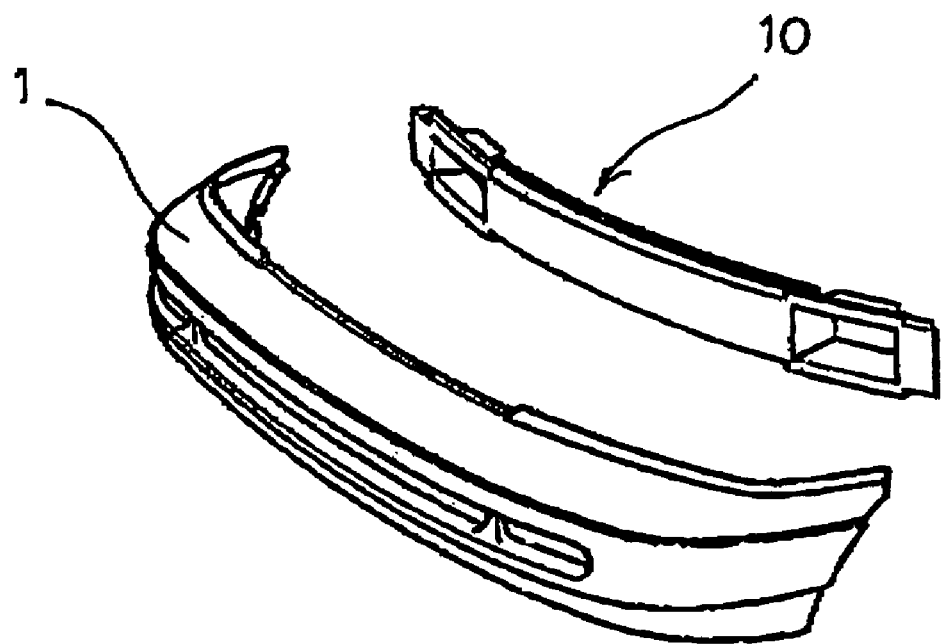
FIG. 1 is an exploded perspective view of the conventional bumper (1) for an automobile and the bumper reinforcement (10)
Figure 2:
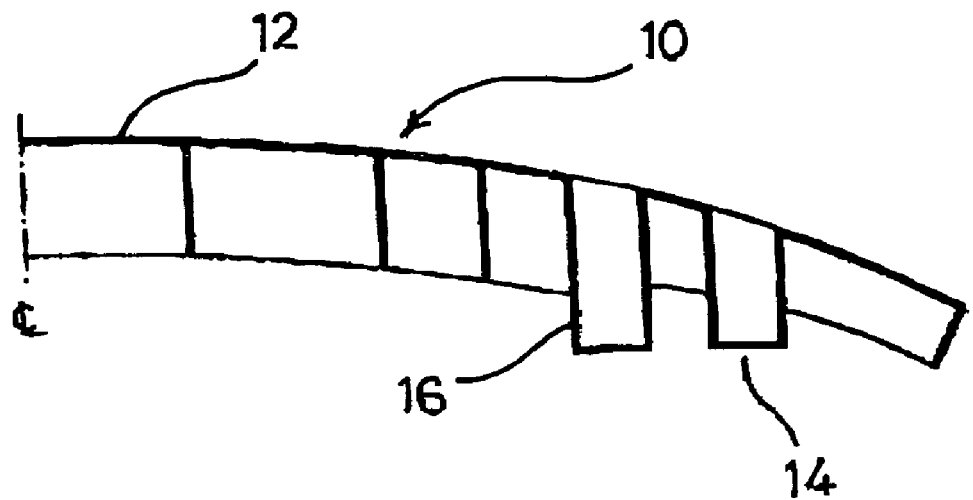
FIG. 2 is a partial sectional view of the conventional bumper reinforcement.
Figure 3:
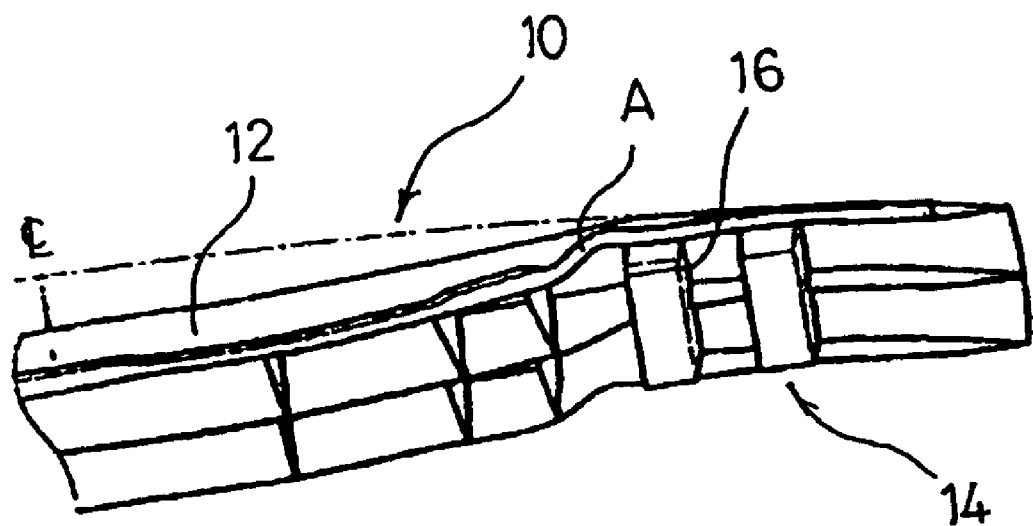
FIG. 3 is a rear perspective view showing a part of the conventional bumper reinforcement.
Figure 4:
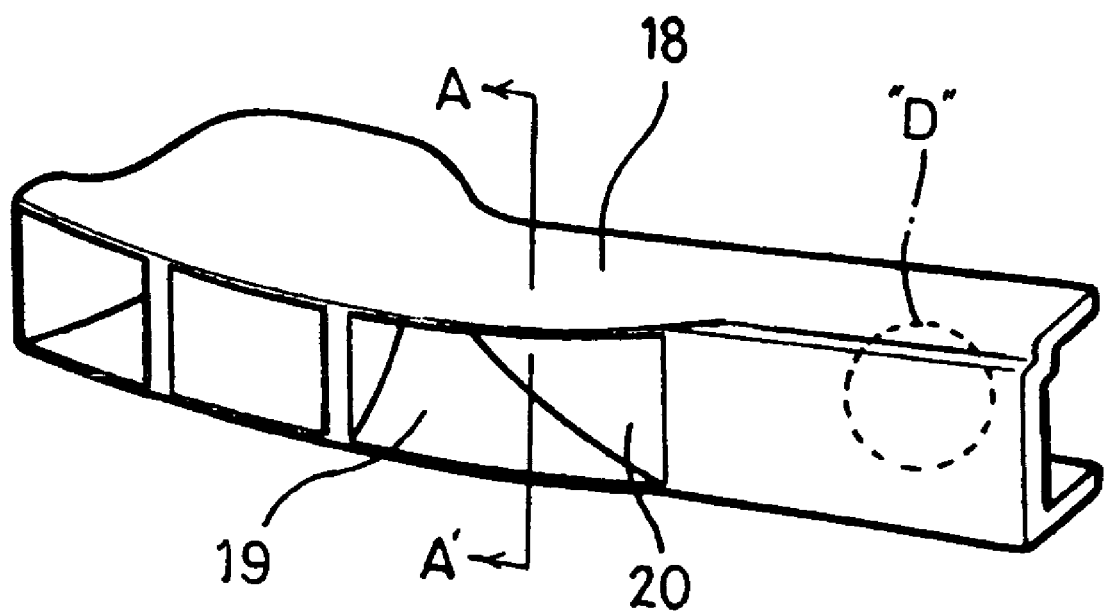
FIG. 4 is a partial perspective view of another conventional bumper reinforcement for an automobile.
Figure 5:
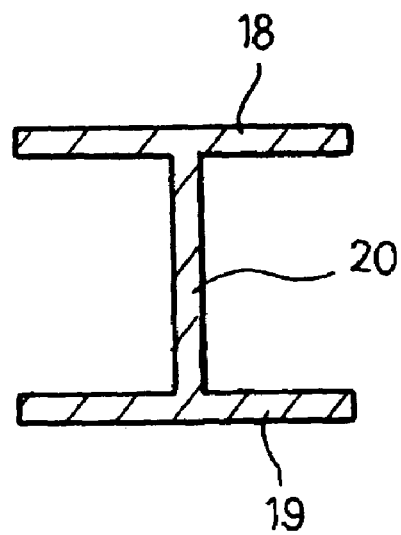
FIG. 5 is a sectional view taken along the line A-A' of FIG. 4.

As described above, according to the conventional bumper reinforcement as shown in FIG. 4, since the upper plate (18) and the lower plate (19) were supported in the middle by the slant surface (20), the connecting part became strengthened and the supportive strength therefor increased. However, in case of collision, the force for deformation could not be absorbed by the connecting part sufficiently, and thus if an impact over a predetermined limit was given to the bumper, the part "D" in FIG. 4 became damaged.

However, according to the present invention, the connecting part (70) between the body (50) and the towers (60) includes the parallel parts (73) in its upper and lower parts and the slant part (74) in the middle thereof, and it has an inwardly curved cross-section. Therefore, although initially the upper connecting plate (75) and the lower connecting plate (76) can be slightly deformed by the collision, the force for deformation can be absorbed, and the breakage of the bumper reinforcement can be prevented for an impact beyond a predetermined impact.

That is, according to the present invention, by forming the connecting part (70) between the body (50) and the towers (60) to have the parallel parts (73) with a predetermined width and the slant part (74), the upper and lower connecting plates (75 and 76) can easily absorb the impacts, so that the breakage of the bumper reinforcement can be prevented and a moderate ratio of deformation can be maintained.

Further, according to the present invention, by adjusting the area ratio of the parallel parts (73) and the slant part (74), a moderate deformation ratio and strength can be obtained, and also by adjusting the angle of the slant part (74), a suitable deformation ratio and strength can be obtained.

It will be apparent to those skilled in the art that various modifications and variations can be made to the present invention without departing from the spirit and scope of the invention. The present invention covers the modifications and variations thereof provided they come within the scope of the appended claims and their equivalents.

What is claimed is:

1. A bumper reinforcement comprising:
   a body having an upper plate, a front plate connected to a front end of the upper plate and extending downward, and a lower plate connected to a lower end of the front plate;
   towers, each of which includes a base plate provided in a rear part thereof to be mounted on a body frame of a vehicle and a lateral plate extending from one end of the base plate to a front part of each tower; and
   a connecting part to connect the body and the towers,
   wherein the front plate of the body has an upper part, a lower part and a middle part, and the connecting part comprises parallel parts to connect the upper and lower parts of the front plate of the body with a front end of the lateral plate of the tower, and a slant part to connect the middle part of the front plate of the body with a rear end of the lateral plate of the tower, wherein the parallel parts comprise a upper connecting part to connect the upper part of the front plate with the front upper end of the lateral plate, and a lower connecting part to connect the lower part of the front plate with the front lower end of the lateral plate, and the slant part is provided between the upper connecting part and the lower connecting part.

2. The bumper reinforcement as claimed in claim 1, wherein an area ratio of the parallel parts and the slant part is determined depending on strength and degree of deformation required for the bumper reinforcement.

3. The bumper reinforcement as claimed in claim 1, wherein an angle ($\alpha$) formed between the base plate of the tower and the slant part is determined depending on strength and degree of deformation required for the bumper reinforcement.

4. The bumper reinforcement as claimed in claim 1, wherein the front plate is grooved in the middle part to form a bead groove.

5. The bumper reinforcement as claimed in claim 4, wherein the bead groove is formed to have the same height as that of the slant part, which has been formed between the upper connecting part and the lower connecting part.

* * * * *